(12) United States Patent
Ogus et al.

(10) Patent No.: US 8,407,434 B2
(45) Date of Patent: Mar. 26, 2013

(54) SEQUENTIALLY WRITTEN JOURNAL IN A DATA STORE

(75) Inventors: Aaron W. Ogus, Redmond, WA (US); Yiking Xu, Redmond, WA (US); Bradley Gene Calder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 12/618,206

(22) Filed: Nov. 13, 2009

(65) Prior Publication Data

US 2011/0119437 A1    May 19, 2011

(51) Int. Cl.
*G06F 12/00* (2006.01)

(52) U.S. Cl. ............... 711/161; 711/104; 711/156
(58) Field of Classification Search ............ 711/161, 711/156, 104
See application file for complete search history.

(56) References Cited

U.S. PATENT DOCUMENTS

| | | | | |
|---|---|---|---|---|
| 5,829,046 | A * | 10/1998 | Tzelnic et al. ............ | 711/162 |
| 6,487,645 | B1 * | 11/2002 | Clark et al. .............. | 711/162 |
| 7,533,298 | B2 | 5/2009 | Smith | |
| 8,040,744 | B2 * | 10/2011 | Gorobets et al. ......... | 365/200 |
| 8,121,977 | B2 * | 2/2012 | Atluri et al. ............. | 707/609 |
| 8,244,960 | B2 * | 8/2012 | Paley et al. .............. | 711/103 |
| 2004/0073908 | A1 * | 4/2004 | Benejam et al. ......... | 718/105 |
| 2008/0059734 | A1 | 3/2008 | Mizuno | |
| 2008/0082591 | A1 | 4/2008 | Ahal | |
| 2008/0168108 | A1 | 7/2008 | Molaro | |
| 2009/0034377 | A1 | 2/2009 | English | |
| 2010/0280999 | A1 * | 11/2010 | Atluri et al. ............. | 707/657 |

OTHER PUBLICATIONS

Picone, Massimiliano, "The Journaling File System in Mac OS X", Nov. 19, 2002, 1 page, http://www.afp548.com/Articles/Jaguar/journaling.html.
"Journaling File System", Aug. 6, 2009, 3 pages, http://en.wikipedia.org/wiki/Journaling_filesystem.
Zeltzer, Margo I. et al, "Journaling Versus Soft Updates: Asynchronous Meta-data Protection in File Systems", Feb. 7, 2002, 14 pages, http://www.usenix.org/publications/library/proceedings/usenix2000/general/full_papers/seltzer/seltzer_html/.
Dell'Omodarme, Matteo, "Journalling Filesystems for Linux", Jul. 2001, 8 pages, http://linuxgazette.net/issue68/dellomodarme.html.

* cited by examiner

*Primary Examiner* — Stephen Elmore
(74) *Attorney, Agent, or Firm* — Shook Hardy & Bacon LLP

(57) ABSTRACT

Systems, methods, and computer storage media for storing and retrieving data from a data store in a distributed computing environment are provided. An embodiment includes receiving data at a data store comprising a sequential journal store, RAM, and a non-sequential target store. When RAM utilization is below a threshold, received data is stored to the RAM as a write cache for the target store and the journal store. But, when the utilization is above the threshold, the data is stored to the journal store without write-caching to the RAM for the target store. When the RAM utilization falls below a threshold, data committed to the journal store, but not write-cached to the RAM for the target store, is later read from the journal store and write-cached to the RAM for a target store.

20 Claims, 8 Drawing Sheets

SEQUENTIALLY WRITTEN JOURNAL IN A DATA STORE

BACKGROUND

Traditionally, a data store in a distributed computing environment relies on expensive batteries to provide durability to volatile memory caches. Therefore, when a power failure occurs, data received by the data store that has yet to be committed to a non-volatile memory store may be maintained, through the use of batteries or other power back-up, until the data has been committed. However, the reliance on back-up power and/or batteries increases the complexity and cost of a data store. Additionally, in a distributed computing environment where multiple copies of data are expected to be committed to different data stores before a commitment of the data is acknowledged, a consistent write time is difficult to attain because of variations in data store resources when the data is committed in a non-sequential manner. Additionally, variations to write times may result from different data streams being written to a common data store. Therefore, optimization of data storage in a distributed computing environment is difficult to obtain because of inconsistent latency times with non-sequential storage.

SUMMARY

Embodiments of the present invention relate to systems, methods, and computer storage media for storing and retrieving data from a data store in a distributed computing environment. An embodiment includes receiving data at a data store. The data store comprising a sequential journal store, Random Access Memory (RAM), and a non-sequential target store. A utilization level of the RAM is determined. When a RAM utilization level is below a predefined threshold, received data is stored to the RAM to be written to both the target store and the journal store, but when the utilization level is above the threshold, the data is stored to the journal store without write-caching, at the RAM, for the target store. Data that has been committed to the journal store and no longer stored in RAM, but not stored to the target store, is later read from the journal store and stored to the RAM once the RAM utilization is below the predefined threshold. In an exemplary embodiment, when data has been requested, data is preferably retrieved from RAM. If the RAM is not a viable option, the retrieval preference is followed by reading the data from a target store. Finally, the retrieval process includes retrieval from the journal store if the data is unavailable from the RAM or the target store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
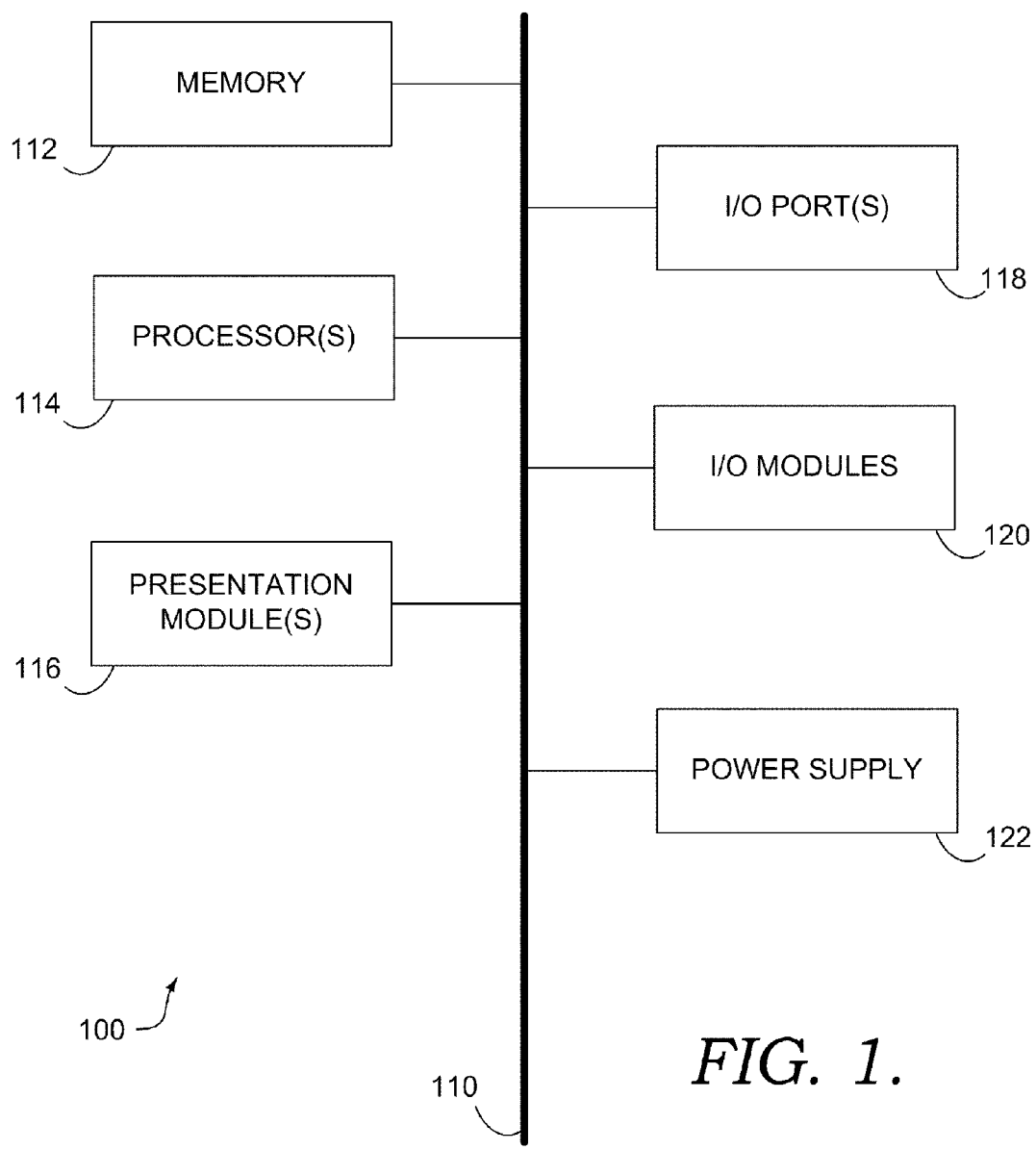
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer storage media for storing and retrieving data from a data store in a distributed computing environment. Data is received at a data store to be committed to a persistent memory store, such as a journal store and a target store. A determination is made if Random Access Memory (RAM) of the data store is above a threshold in which the RAM is overburdened to serve as a write cache for a target store that commits the data in a non-sequential manner. If the RAM is below the predefined threshold, the data is committed to a journal store that writes the data in a sequential manner and the data is also stored to the RAM for committal to a target store. However, if the RAM is above the predefined threshold, the data is committed to the journal store without write-caching the data to the RAM for a target store. The data that is not write-cached to RAM but committed to the journal store is read to the RAM to be committed to a target store when the level of utilization of the RAM is below the predefined threshold. A request for the data is fulfilled based on the location in which the data is committed or stored. In this example, if the data is available in RAM, the data is served from the RAM. If the data is committed to a target store, the data is served from the target store. But if the data is not committed to the target store and not stored in the RAM, the requested data is served from the journal store.

Accordingly, in one aspect, the present invention provides a method for sequentially writing data to a journal store to provide random access at a target store in a distributed computing environment. The method includes receiving data at a data store, the data store comprising a journal store, Random Access Memory (RAM), and at least one target store. The method also includes determining a first quantity of utilization of the RAM. The first quantity is greater than a predefined threshold quantity. In response to determining the first quantity of utilization, sequentially writing the data to the journal store without write-caching the data at the RAM for storing to at least one target store. The method also includes determining a second quantity of utilization of the RAM. The second quantity is less than the predefined threshold quantity. In response to determining the second level of utilization, reading the data from the journal store and storing the data in the RAM for writing to the at least one target store.

In another aspect, the present invention provides a computer storage media having computer-executable instructions embodied thereon, that when executed by a computing system having a processor and memory, cause the computing system to perform a method for sequentially writing data to a journal store to provide random access at a target store in a distributed computing environment. The method includes receiving data at a data store, the data store comprising a journal store, a target store, and RAM. The RAM serves as a write cache for the target store. The method also includes storing the data in the RAM to be written from the RAM to the target store for random access. The method also includes writing the data, in a sequential manner, to the journal store from the RAM. The method also includes receiving a request for the data. Prior to the data being written to the target store, providing the data in response to the request, wherein the data is provided from the RAM without providing the data from the journal store.

A third aspect of the present invention provides a method for sequentially writing data to a journal store to provide random access at a target store in a distributed computing environment. The method includes receiving a first data at the data store in the distributed computing environment. The data store comprises the journal store, the target store, and RAM. The method also includes determining a first utilization level of the RAM. The first utilization level is less than a predefined threshold level. The method also includes storing the first data in the RAM and sequentially writing the first data to the journal store. The first data is stored in the RAM to be written to the target store in a non-sequential manner. Prior to writing the first data to the target store, reading the first data from the RAM instead of the journal store in response to a request for the first data. The method also includes receiving a second data at the data store. The method also includes determining a second utilization level of the RAM. The second utilization level is greater than the predefined threshold level. In response to determining the second utilization level, storing the second data to the RAM to be written in a sequential manner to the journal store without write-caching, at the RAM, the second data for the target store. Subsequent to storing the second data to the RAM, determining a third level of utilization of the RAM, wherein the third level of utilization is less than the predefined threshold. In response to determining the third utilization level, reading the second data from the journal store and storing the second data in the RAM to allow the second data to be written to the target stored.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation module(s) 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media and storage devices may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
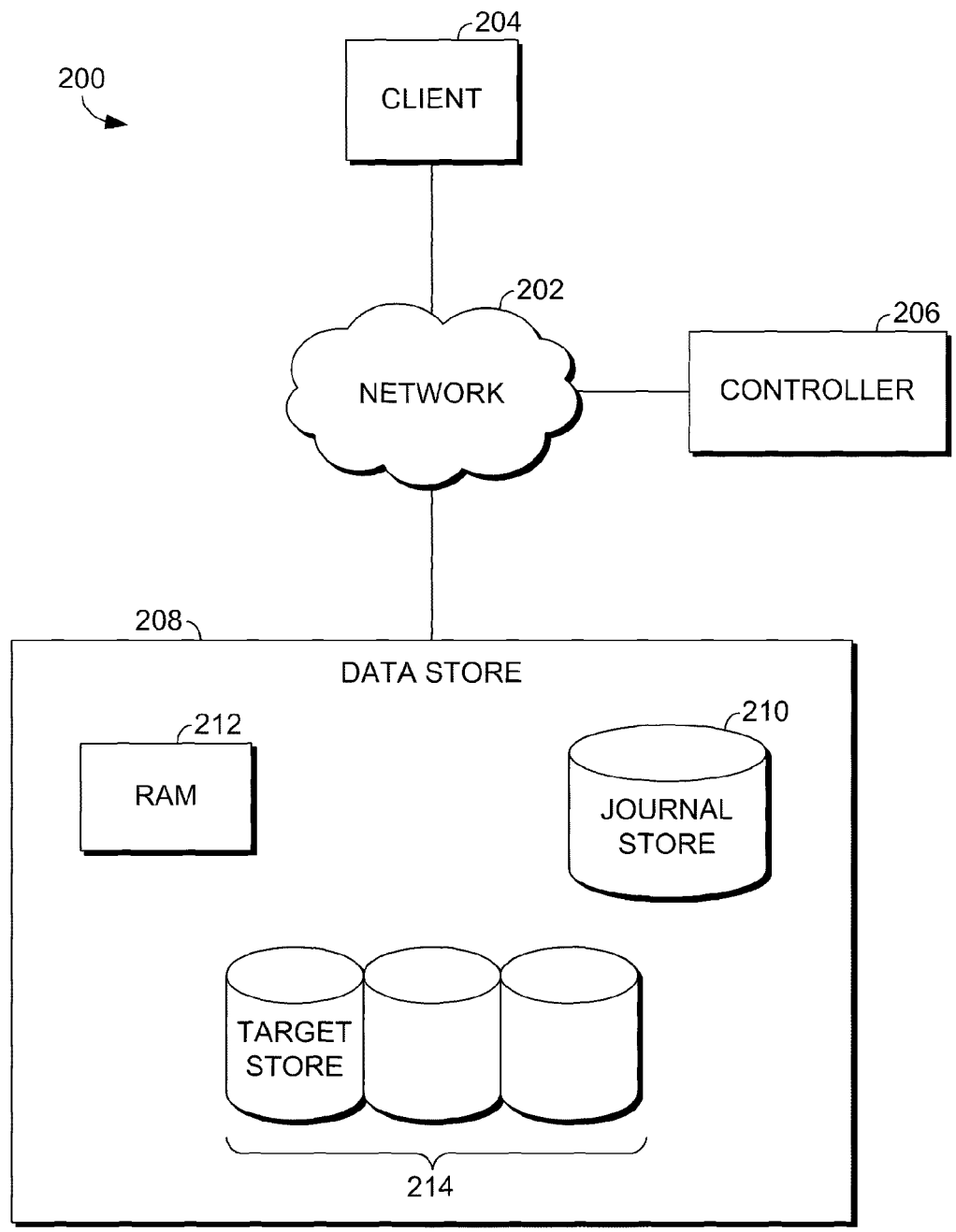
FIG. 2 depicts an exemplary distributed computing environment in which embodiments of the present invention may be employed.

With reference to FIG. 2, a block diagram is provided illustrating an exemplary distributed computing environment 200 in which embodiments of the present invention may be employed. It should be understood that this and other arrangements described herein are set forth only as examples. Other arrangements and elements (e.g., machines, components, computer, networks, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a client 204, a controller 206, a data store 208, and a network 202. Each of the components shown in FIG. 2 may be any type of computing device, such as computing device 100 described with reference to FIG. 1, for example. The components/devices may communicate with each other via the network 202, which may include, without limitation, one or more local area networks (LANs) and/or wide area networks (WANs). Such networking environments are commonplace in offices, enterprise-wide computer networks, intranets, distributed computing networks, and the Internet. It should be understood that any number of client devices, controller devices, networks, and data stores may be employed within the system 200 while staying within the scope of the present invention. Additionally other components not shown may also be included within the system 200.

The client 204 is functional to provide data to the data store 208. In an exemplary embodiment, the client 204 is a service in a distributed computing environment that is requesting to store or to access data located at the data store 208. For example, the client 204 may be a computing device responsible for calling a particular role for a service. In this example, the client 204 may request or supply data associated with the role for which it is responsible. The data is requested or supplied through the network 202 to the data store 208.

In yet an additional exemplary embodiment, the client 204 is a computing device used by a user of the distributed computing environment 200. For example, a user may include a human operator, a computing service, and/or a functionality that is capable of taking advantage of resources provided by the distributed computing environment 200. It is contemplated, that in an exemplary embodiment, the client 204 is any entity, device, or service that is capable of either providing or receiving data in a distributed computing environment.

In an additional exemplary embodiment, the controller 206 is responsible for controlling the flow of information and data among devices and components of the distributed computing environment 200. In an exemplary embodiment, the controller 206 is a stream manager. For example, the controller 206 is a computing device associated with either a fabric layer and/or a storage layer of the distributed computing environment 200. Therefore, the controller 206, in an exemplary embodiment, is responsible for controlling the flow of information and data within the distributed computing environment 200. This may include directing the client 204 to the data store 208 to either retrieve or deposit data and/or information.

Further, the controller 206 may be functional to control the flow of data at the data store 208. In this example, functionality that will be discussed with respect to FIG. 4 may be monitored and even controlled by the controller 206. However, it is understood that additional methods may be implemented to handle the flow of information at the data store, such as a data store associated with a processor and memory.

The data store 208 includes Random Access Memory (RAM) 212, a journal store 210, and one or more target stores 214. The data store 208 is functional to commit data to memory in a distributed computing environment, such as the distributed computing environment 200. In an exemplary embodiment, the RAM 212 is a volatile memory, such as dynamic random access memory (DRAM). Therefore, data stored in the RAM 212 is not retrievable following a loss of power to the RAM 212. This is in contrast to non-volatile memory where data stored therein may still be retrieved following a loss of power to the non-volatile memory. In yet an additional exemplary embodiment, the RAM 212 is non-volatile solid state memory, such as flash memory. In an exemplary embodiment, the functionality of RAM 212 is combined with a non-volatile journal store, so that the RAM 212 and the journal store are a common store. In this example, data may be written sequentially to the journal store/RAM 212, data may be read from the journal store/RAM 212, and data may be written lazily to a target store from the journal store/RAM 212.

The RAM 212 serves as a write-cache for the target store 214 in the example illustrated in FIG. 2. Therefore, the RAM 212 allows the target store 214, which typically commits data to a file from which it will be read, to have higher throughputs and potentially longer latency in committing received data. Additionally, the RAM 212 serves as a write cache for the journal store 210, but because the journal store 210, in this exemplary embodiment, writes sequentially, the journal store 210 has a higher potential throughput than the target store 214. Therefore, RAM 212 resource are consumed for a shorter period of time when serving as a write-cache for the journal store 210 than when serving as a write-cache for the target store 214, in an exemplary embodiment. However, as previously stated, a read throughput of a randomly accessible target store is typically greater than that of a sequentially written journal store. These advantages may be realized through the combination of the RAM 212, the target store 214, and the journal store 210.

The target store 214 is non-volatile memory functional for storing data to be read by users of the distributed computing environment 200. For example, the target store 214 may be a hard-disk drive that allows for random input/output operations. The data store 208 may include a plurality of target stores, such as the target store 214. Each of which is functional for storing data to be read in response to a request for data. In an additional exemplary embodiment, the target store 214 is flash-based memory or the like.

The target store 214, in an exemplary embodiment, serves as an initial non-volatile source from which requested data is served. However, in the event that the data is available in RAM, the data may then be served from the RAM 212. For example, when data is received it is traditionally cached in the RAM 212 prior to being written to the target store 214. During a time period between caching (storing) the received data at the RAM 212 and prior to the data being committed to the target store 214, a request to serve the data may be received. In this example, the data may be served directly from the RAM 212 instead of delaying the serve until the data is committed to the target store 214. It is contemplated that the data may be served from a number of different stores, such as the RAM 212, the target store 214, and/or the journal store 210.

The journal store 210 is memory functional to maintain write records of received data. In an exemplary embodiment, the journal store 210 writes the data sequentially as opposed to writing the data for random access. The journal store 210, in an exemplary embodiment, is a spinning media that support sequential I/Os, such as a hard disk. In an additional exemplary embodiment, the journal store 210 is a solid state non-volatile media that supports sequential and/or random access I/Os, such as flash memory.

The following is an exemplary embodiment in which the present invention may be implemented. This example is not intended to be limiting as to scope, but is instead provided to illustrate at least some of the advantages of implementing a data store, such as that depicted at data store 208 of FIG. 2.

In a distributed computing environment, such as the distributed computing environment 200, a requirement may include that data is committed a predefined number of times before providing confirmation to a controller that the data has been committed. For example, a system may have a requirement that a given data is committed to at least three data stores to ensure reliability, durability, and scalability. Therefore, a system may not provide a commitment acknowledgement to a client application until the at least three copies of the data have been successfully committed to three different data stores. However, with such a system, the acknowledgement of committed data can only be as fast as the slowest of all data stores to commit the data. Therefore, it is desirable to increase the throughput of data at a data store to reduce the latency between reception of data and commitment of the data.

Traditionally, sequentially writing of data is faster than writing data to a store that supports random access. For example, larger quantities of data in a given time may be written to a sequential store, such as a journal store, than may be written to a store that support a random access, such as a target store. This is because the sequential writing of data may avoid the time typically associated with a "seek" operation on a traditional store that supports random access. In a specific example, sequentially writing data may achieve 100 MB per second throughput, while a store that supports random access may only be able to achieve 10 MB per second.

Because of the latency associated with writing data to a random access store (i.e., a memory store that allows for data to be retrieved with random access), committing data to a sequential store (i.e., a memory store that writes data sequentially) may reduce latency and provide a more consistent time delay between receiving the data and providing an acknowledgement of the data being committed. Therefore, the committal of data to a sequential store allows a data store to commit data at a faster and more deterministic throughput than relying solely on committal to a random access store. In this example, data is committed once the data is written to a persistent memory store. Data, in this example, is acknowledged as being committed regardless if it is stored at a sequential store or a random access store e.g., regardless of a journal store or a target store.

A random access store may be advantageous for purposes of retrieving specific portions of data stored in a memory store. Therefore, while a higher throughput may be achieved when storing data to a sequential store, a random access store may be preferred for purposes of retrieving the data. As a result, embodiments of the present invention combine the use of both a sequential store and a random access store within a data store. For example, the journal store 210 is a sequential store and the target store 214 is a random access store in an exemplary embodiment.

Exemplary Embodiment

In an exemplary embodiment, a data store that serves as a storage node in a distributed computing environment may contain two memory stores, such as a journal store and a target store. The journal store is used as a sequential write-only memory store. Received data is scheduled to be stored to both the journal store and the target store. Once either of the pending writes, either to the journal store or the target store, is completed, the data is acknowledged as being committed. Because the journal drive writes sequentially, the journal store usually, in this example, completes the write prior to the target store because of a greater throughput.

In this example, if a request for the data is received once the data has been committed to the journal store, but not yet committed to the target store, the data may be served from the RAM that is serving as a write cache for the target store. Serving from the RAM as opposed to the journal store, in this example, is preferred and advantageous as the RAM also supports random access and allows the journal store to maintain a write-only mode. A write-only mode allows the journal store to maintain a higher throughput than if the journal store were also being utilized as a read source. In an exemplary embodiment, the journal store remains in a write-only mode, unless data that is stored to the journal store has not been stored to a target drive and that data is no longer stored in the RAM. In this example, the journal store may switch from a write-only mode to a read-only mode. In this exemplary embodiment, high throughputs traditionally provided by a journal store are lost once the journal store enters a read-only mode. Therefore, in this example, the journal store is preferentially maintained in a write-only mode.

Further, if a request for the data is received after the data has been committed to both a journal store and a target store; the data is preferentially, in this exemplary embodiment, served from the target store when the RAM no longer maintains the data. Additionally, when the data is committed to both the target store and the journal store, the data may be discarded from the RAM.

In this exemplary embodiment, the journal drive is not read, but instead acts as a write-only journal store. This may be equated to a high-speed redundant durable cache for writes that eventually are to be committed to a target store. However, if a process at a data store is terminated (e.g., system failure, software failure, power failure), when the data store (i.e., storage node) is restarted any data that was reported as being committed but not successfully written to a target store is recovered from the journal and written to the target store as part of a restart procedure. For example, the data stored in RAM waiting to be committed to the target store may be lost during the termination because RAM, in this example, is volatile. Therefore, the journal store that is non-volatile, in this example, may be read to recover the data lost from RAM.

Additionally, in an exemplary embodiment, incoming write requests may be written to a journal store instead of additionally storing those requests to the RAM as a write-cache for a target store. For example, in a state where a predefined threshold of RAM is being utilized, such as an absolute value of mega bytes or a relational number such as a percentage of capacity, as a write cache for a target drive, incoming write requests (e.g., data) may be directed to a journal store instead of additionally maintaining those requests in the RAM as a cache for the target store. Once the RAM utilization pressure is relieved (e.g., the RAM utilization is below the predefined threshold), the journal store may then enter into a read-only mode that allows for the sequential recovery of the requests that have yet to be committed to the target store. In an exemplary embodiment, no writes are scheduled for the journal store during this time. However, in an additional exemplary embodiment, the journal store maintains the capability of writing sequentially incoming requests during a read function.

In yet an additional exemplary embodiment, a journal store that is typically in a write-only mode may allow data stored therein to be read when a request is unable to be serviced by either a target store or RAM. However, in an exemplary embodiment, a journal store is traditionally in a write-only mode with an occasional read-only mode once a period of high RAM demand has passed. The change in mode may be accomplished by changing the mode in which the journal store is operating.

An exemplary embodiment of the present invention may be implemented in conjunction with a data storage service of a distributed computing environment. For example, Windows Azure Storage, a system for storing data with replication for reliability, which is available from the MICROSOFT Corporation of Redmond Washington, is an exemplary data storage service used in a distributed computing environment.

Accordingly, any number of components may be employed to achieve the desired functionality within the scope of embodiments of the present invention. Although the various components of FIG. 2 are shown with lines for the sake of clarity, in reality, delineating various components is not so clear. Further, although some components of FIG. 2 are depicted as single blocks, the depictions are exemplary in nature and in number and are not to be construed as limiting.

Figure 3:
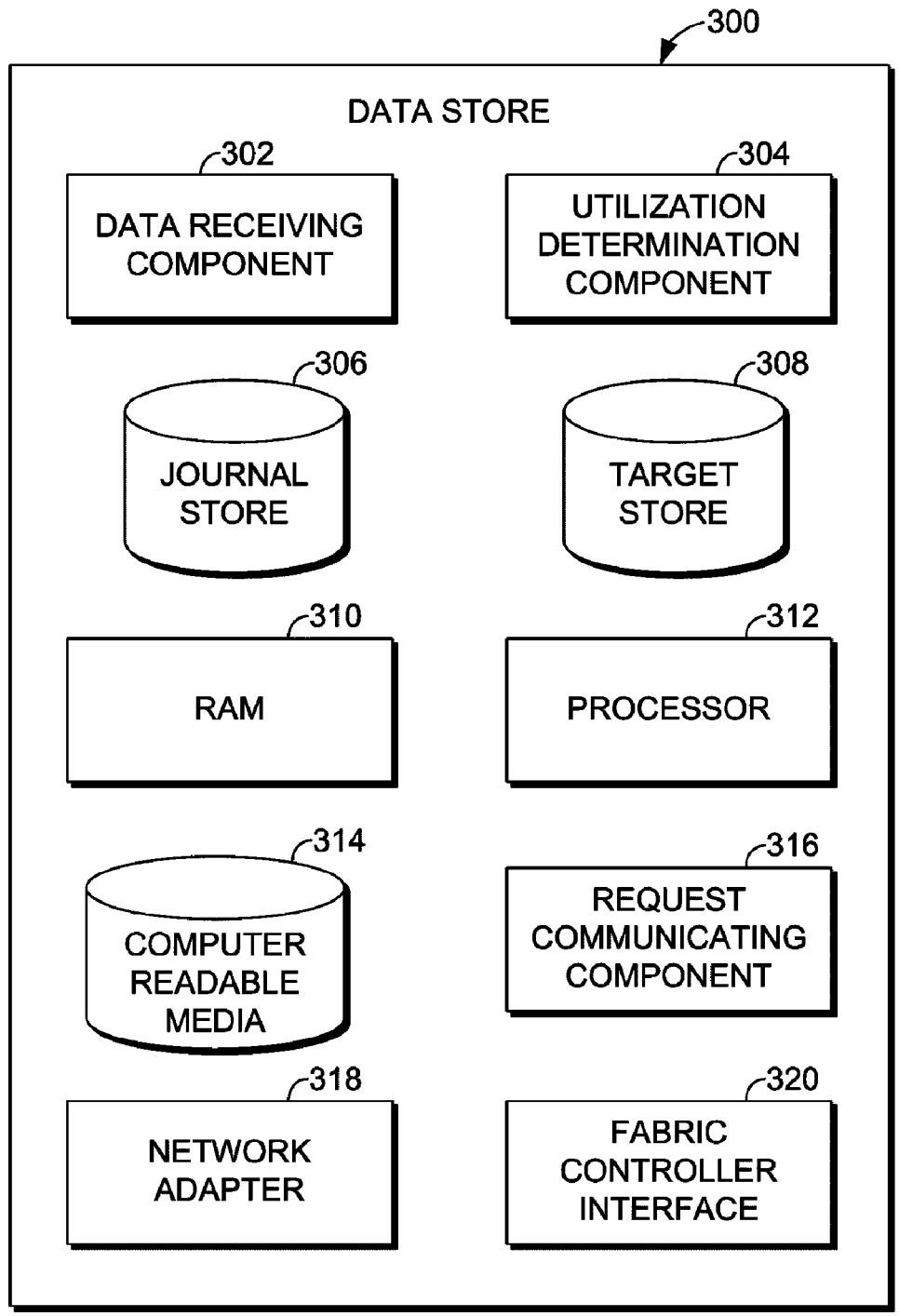
FIG. 3 depicts an exemplary data store in accordance with embodiments of the present invention.

Turning to FIG. 3, an exemplary data store 300 is depicted in accordance with an embodiment of the present invention. The data store 300 includes a data receiving component 302, a utilization determination component 304, a journal store 306, a target store 308, RAM 310, a processor 312, computer-readable media 314, a request communicating component 316, a network adapter 318, and a fabric controller interface 320.

The data receiving component 302 is functional to receive data at the data store 300. In an exemplary embodiment, data includes requests to commit information to a durable memory store. Data may also include requests to retrieve and serve information from a memory store. Therefore, in a distributed computing environment, information is requested to be written to and retrieved from a data store. The data receiving component 302 is an interface, either as a hardware component, software component, or a combination of both, that allows the data store to serve an intended purpose in a distributed computing environment.

The utilization determination component 304 is functional to determine a level of utilization of the RAM 310. For example, the utilization determination component 304 may identify an absolute quantity of the RAM 310 that is currently being utilized as a write-cache to the target store 308 (and as a read source for requests to serve data). An absolute quantity may include a quantity of bits, bytes, or the like of the RAM 310 being or scheduled to be utilized. The utilization determination component 304 may also determine a relative quantity of the RAM 310 utilization. For example, a percentage of the RAM 310 may be 20% utilized as a write-cache for the target store 308. As a result, the utilization determination component 304 is able to identify, either an absolute or relative value, of the utilization of the RAM 310.

The journal store 306 is a memory store. As previously discussed with respect to the journal store 210 of FIG. 2, the journal store 306 may be a memory store that durably writes data sequentially. The sequential writing of the data to the journal store 306 would facilitate a high throughput that may exceed the throughput of a random access memory store, such as the target store 308. In an additional exemplary embodiment, the journal store is a solid-state nonvolatile memory store. Because solid-state nonvolatile memory does not have a typical seek delay associated with a traditional hard disk, sequential writing of the data may not be necessary in an exemplary embodiment. Therefore, sequential writing may not be implemented at a journal store when solid state nonvolatile memory is used as a journal store.

The target store 308 is a memory store. As previously discussed with respect to the target store 214 of FIG. 2, the target store 308 may provide random access durable storage that is a source from which requests for data are served. In an exemplary embodiment, the target store 308 is a solid state nonvolatile memory that facilitates storing data for random access.

The RAM 310 is random access memory. In an exemplary embodiment, the RAM 310 is volatile memory that functions as a write cache for the target store 308. The RAM 310, in an additional embodiment, may serve requested data. Typically, the RAM 310, in this exemplary embodiment, serves requested data when the data is available at the RAM. In yet another exemplary embodiment, the RAM 310 is a solid state memory that provides non-volatile memory storage.

The processor 312 is a computing processor similar to that previously discussed as the processor(s) 114 of FIG. 1. For example, the processor 312 is functional to process information received in one format and transform that information into an identifiably different format utilizing memory and/or the computer-readable media 314. The computer-readable media 314 is media readable by one or more computing devices, including the data store 300.

The request communicating component 316 is functional to send and/or receive requests. In an exemplary embodiment, the requests are requests for data stored or intended to be stored in the data store 300. For example, a request may be received to store data in the data store 300, such as at the target store 308 and/or the journal store 306. In an exemplary embodiment, a request does not indicate a particular store (i.e., journal store, target store) within a data store to which data is to be stored, but instead, is merely a request for the data to be stored at a data store in general. Similarly, a request may be received to serve data that is committed to the target store 308 or stored to the RAM 310.

The network adapter 318 is functional to facilitate communication between the data store 300 and a network. For example, the data store 300, in an exemplary embodiment, is a computing device that stores data for a distributed computing system. The data store 300 is therefore connected to the distributed computing system by way of at least one network. The at least one network is accessed by way of the network adapter 318.

The fabric controller interface 320 is functional to interface with a fabric controller of a distributed computing environment. For example, a distributed computing environment may rely on a fabric controller to oversee and maintain one or more components of a distributed computing environment. As a result, the data store 300 may utilize the fabric controller interface 320 as a portal by which a fabric controller may communicate with the data store 300.

It is contemplated that any of the components, devices, or the like discussed herein with respect to FIG. 3 may have an associated processor and/or memory. Further, it is contemplated that any of the devices, components and the like may be their own computing device or associated with one or more computing devices to achieve the functionality for which each unit is described herein as facilitating.

Accordingly, any number of components may be employed to achieve the desired functionality within the scope of embodiments of the present invention. Although the various components of FIG. 3 are shown with lines for the sake of clarity, in reality, delineating various components is not so clear. Further, although some components of FIG. 3 are depicted as single blocks, the depictions are exemplary in nature and in number and are not to be construed as limiting.

Figure 4:
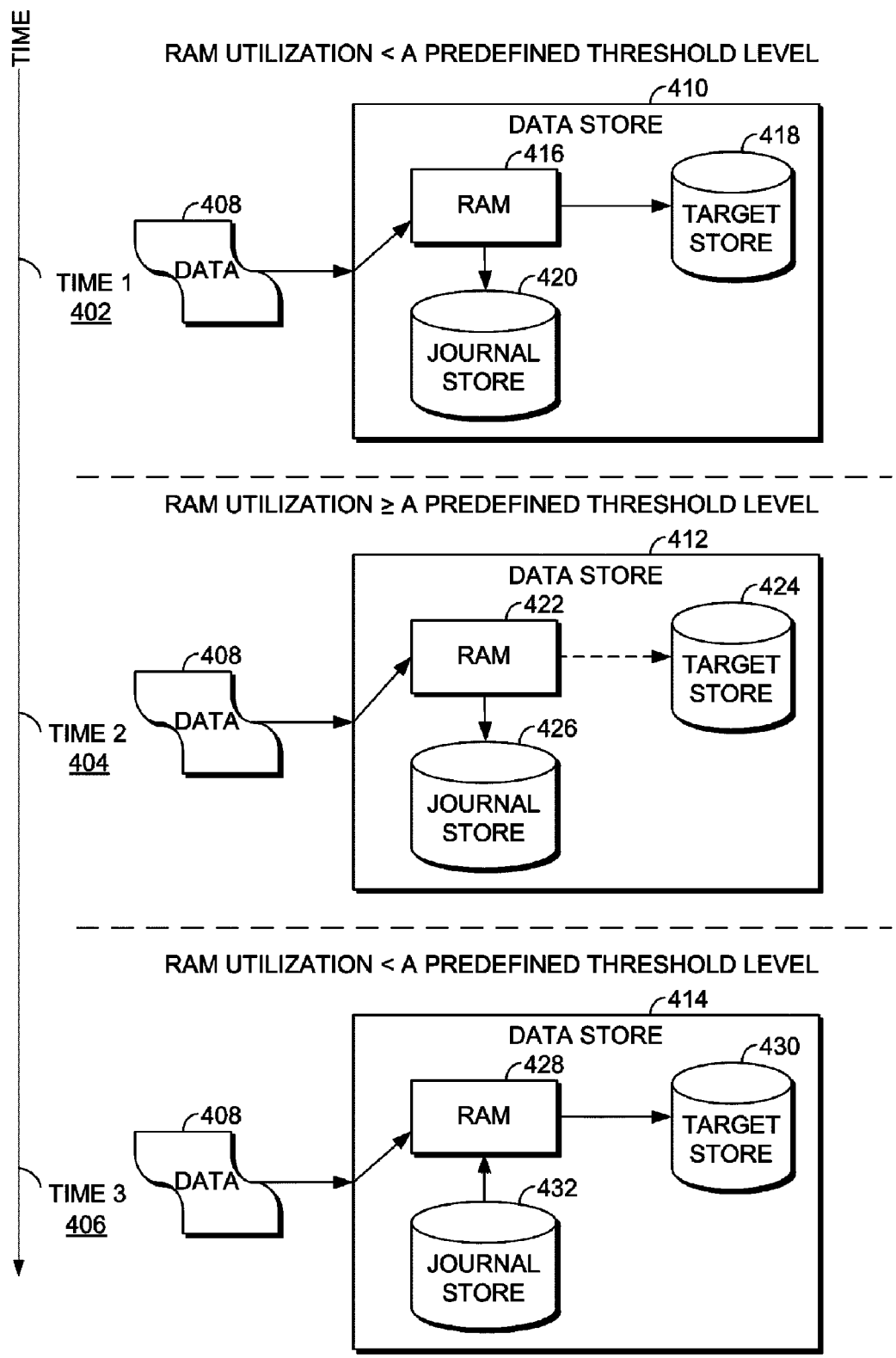
FIG. 4 depicts an exemplary data flow path over three time periods in accordance with embodiments of the present invention.

Turning to FIG. 4, an exemplary data flow path is predicted over three time periods in accordance with embodiments of the present invention. A time-1 402 represents a period in which RAM utilization is less than a predefined threshold level of utilization. For example, a predefined threshold may be established so that RAM utilization for purposes of write-cache to a target store is not to exceed 20%. Therefore, an exemplary predefined threshold level is established at 20%. However, it is contemplated that the predefined threshold level may be any quantity, absolute or relative. Therefore, for example, the predefined quantity may be 10%, 20%, 30% . . . 100% of RAM in a data store. In an exemplary embodiment, in order to transition from time 1 402 to time 2 404, the predefined threshold level is a value less than 100%.

The time-1 402 includes data 408 and a data store 410. The data store 410 includes RAM 416, a target store 418, and a journal store 420. The data 408 is received at the RAM 416 in the data store 410 as indicated by the connecting solid arrows. Because the RAM utilization is less than the predefined threshold level, the data is concurrently passed along, as indicated by the connecting solid arrows, to both the journal store 420 and the target store 418. The concurrent passing of data indicates that the data is write-cached at the RAM 416 for writing to the target store 418 and the journal store 420. In particular, the RAM 416 stores the data so that the data may be committed to the target store 418 for random access, as indicated by the solid arrow connecting the RAM 416 and the target store 418. Additionally, the data is passed along to the journal store 420 for purposes, in this exemplary embodiment, of sequentially writing the data to the journal store 420.

At a time-2 404 where the RAM utilization is greater than or equal to the predefined threshold level, the flow of the data within a data store 412 changes. The data store 412 also includes RAM 422, a target store 424, and a journal store 426. However, contrary to the TIME-1 402, the data store 412 at the time-2 404 prevents, abstains, or does not write cache the newly received data 408 to the target store 424. But, in this exemplary embodiment, data previously received that has been scheduled and cached to be written to the target store 424 is passed to the target store for committal as indicated by the dashed line. Therefore, in this exemplary embodiment, when the RAM utilization exceeds or is equal to the predefined threshold level, newly received data is not continued to be cached at the RAM 422 for the target store 424 in an attempt to relieve the figurative pressure being exerted on the RAM 422 by the current conditions. This abstention from caching the data 408 at the RAM 422 for the target store 424 allows the RAM 422 to continue to serve as a write cache for the target store 424 for the data already stored at the RAM 422, as indicated by the dashed arrow connecting the RAM 422 and the target store 424. As a result, as data is committed to the target store 424, the cached version of the committed data may be removed from the RAM 422, if the data has also been committed to the journal store 426, freeing resources of the RAM 422 and therefore reducing the RAM utilization.

Further, at time-2 404, the data is passed to the journal store 426 for continued writing to the journal store 426, as indicated by the solid connecting arrow. In an exemplary embodiment, the journal store 426 remains in a write-only mode that writes the data 408 sequentially.

At a time-3 406 the RAM utilization is once again less than the predefined level. In this exemplary embodiment, the RAM utilization has reduced at time-3 406 from time-2 404 as a result of incoming data not being communicated to the RAM 422 for write caching to the target store 424. This allows the RAM 422 to continue to reduce an amount of cached data by committing the data to the target store 424. As a result, the RAM utilization is less than the predefined level at time-3 406.

At the time-3 406, the data 408 continues to be received at a data store 414. However, in this exemplary embodiment, the journal store 432 is in a read-only mode to pass data that has been stored to the journal store, but not yet committed to a target store 430. This is demonstrated by a solid arrow connecting the journal store 432 and the RAM 428. Typically, in this example, this situation arises as a result of a scenario discussed at time-2 404 where the data is not write-cached at the RAM 422 to allow the RAM utilization to reduce. Therefore, the journal store 432 at the time-3 406 serves as a durable write cache for the target store 430 during this period. In an additional exemplary embodiment, the data 408 at the time-3 406 is also scheduled to be written to the journal store 432 as the journal store 432 is operating in a read/write mode, which may be possible if the journal store is a solid state non-volatile memory or a disk that has limited seek times. It is contemplated that a data store that is employing a journal store that sequentially writes data will lose efficiencies when the journal store is in a read-only mode. This is because the journal store, in this example, is now functioning as a durable write cache for a target store.

In an exemplary embodiment, data received at a data store is committed to RAM and a journal store when a level of utilization of the journal store is below a defined threshold. The defined threshold may be established at a size of space at which the journal store is not to exceed. When the journal store utilization is below the defined level, the data is also scheduled to be committed, in parallel, to a target store. However, in this example, if the quantity of utilization for the journal store is above the defined threshold, the data is committed to a target store and not to the journal store.

For example, when the system is an append-only system, the method of sending data only to a target store when utilization of a journal store is above a defined threshold is functional because incoming writes are to a new address in an append-only system. Further, it is contemplated in an exemplary embodiment, when data is no longer sent to a journal store because of a utilization level exceeding a defined limit or a journal store in a read-only mode, new writes are append-only.

Additionally, in an exemplary embodiment where the utilization of a journal store is above the defined threshold and an in-place storage system (as opposed to an append-only system) is being used, the following methods may be implemented. For example, an address range for new writes is identified already existing in the RAM. If the address range is not in RAM, the data is committed to a target store without writing the data to the journal store. However, if the data has been written to the RAM, as indicated by the address range being identified in the RAM, the data is therefore also written to a journal store. Additionally, if the address range is identified in the RAM, the data in the RAM is updated and the updated RAM data is scheduled to be written to a target store. Therefore, in this example, the RAM will include the latest bits for the identified address range. In an exemplary embodiment, when requested data is not in RAM, the data is read from a target store.

In yet an additional exemplary embodiment of the present invention, the data flow within a data store may be similar to that depicted at time-3 406 following a data store restart resulting from a process termination. For example, a restart procedure for the data store 414 may include identifying data committed to the data store 414, but not yet committed to the target store 430. The identified data may then be retrieved from the journal store 432 to be written to the target store 430 utilizing the RAM 428 as a cache. It is contemplated that a restart procedure of the data store 414 would not allow communication of the data 408 until completion of the restart.

In an exemplary embodiment, when data has not been committed to a target store, but the data has been committed to a journal store, the journal store is placed in a write-only mode so that data from the journal store may be read from the journal store and committed to the target store. Further, in this example, data of a particular extent is not committed to a target store until previously received data of that extent has been committed to the target store. Therefore, once data for an extent is only stored to a journal store (not to a target store), new data is not committed to the target store until the extent data has been committed to the target store from the journal store.

At time-3 406, the journal store 432 is in a read-only mode of operation. If the journal store 432 is a spinning media (e.g., hard disk), the journal store 432, in this example, does not accept writes of data while in the read-only mode. This refusal to accept writes prevents the journal store 432 from relegating its performance to that of a random accesses data store. Therefore, when the journal store 432 is a spinning media and in read-only mode, incoming data is received at the RAM 428 and write-cached to be written to the target store 430. As a result, the overall performance of the data store 414, in this embodiment, may diminish as the write-cache benefit of a journal store 432 is not being realized. However, it is contemplated that two or more journal stores may be implemented to regain the lost efficiencies when one of the journal stores is operating in a read-only mode. For example, a second journal store that acts as a redundant durable write cache to a first journal store may come online when the first journal store enters into a read-only mode. Further, the redundant journal stores may operate in parallel with logic that balances the writes to an appropriate journal store.

Figure 5:
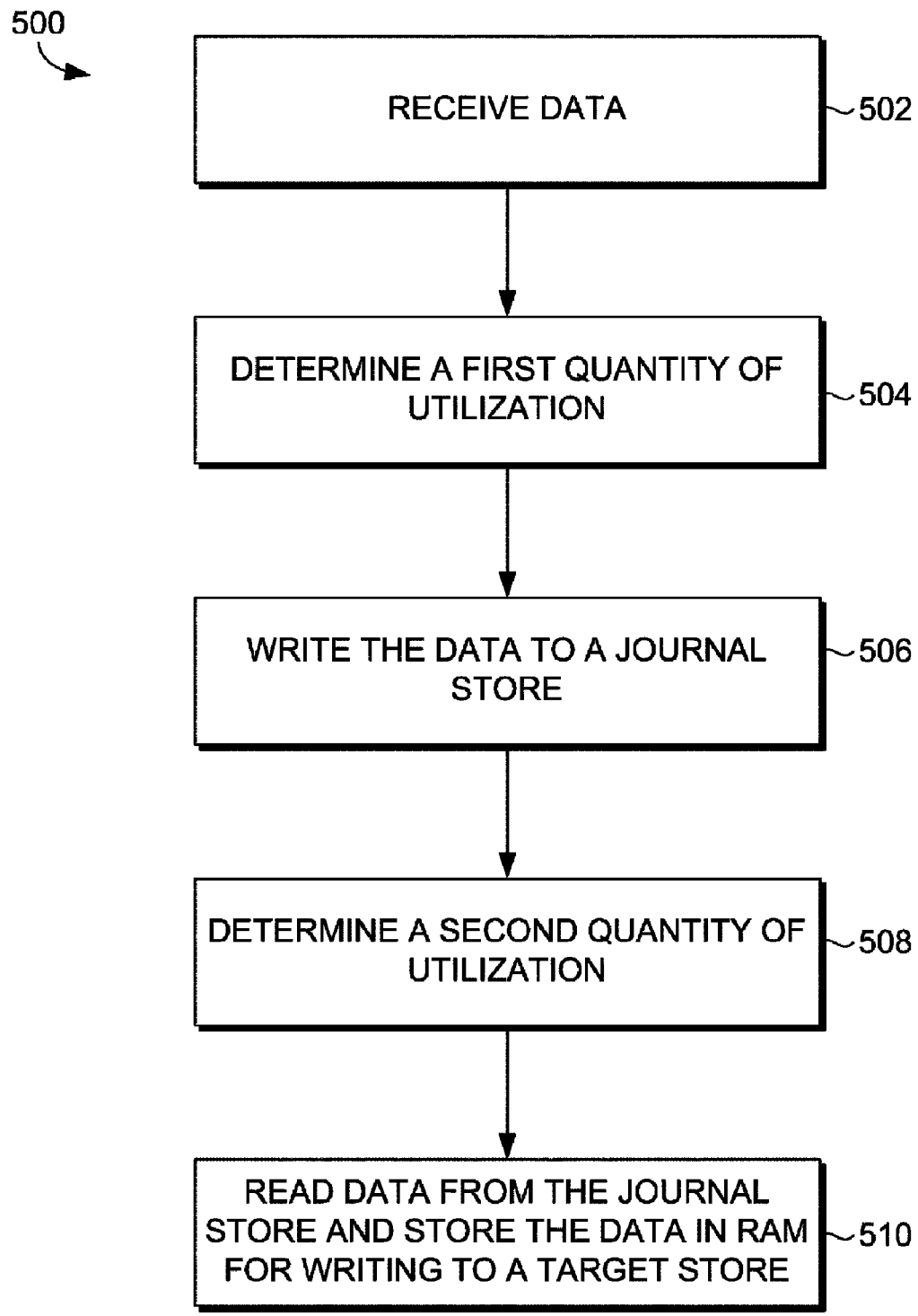
FIG. 5 depicts a method for sequentially writing data to a journal store to provide random access at a target store in a distributed computing environment in accordance with an embodiment of the present invention.

FIG. 5 depicts a method 500 for sequentially writing data to a journal store to provide random access at a target store in a distributed computing environment in accordance with an embodiment of the present invention. At a step 502 data is received. For example, data may be received at a data store that includes a journal store, RAM, and at least one target store. As previously discussed, the data may be received at a data store by a data receiving component, such as the data receiving component 302 of FIG. 3.

At a step 504, a first quantity of utilization is determined. In an exemplary embodiment, the first level of utilization is a quantity of RAM being used as a write cache for a target store. Additionally, as previously discussed, the quantity may be an absolute or relational quantity. In an exemplary embodiment, the RAM utilization quantity is determined by a utilization determination component, such as the utilization determination component 304 of FIG. 3. Further, the first quantity of utilization determined at the step 504, in an exemplary embodiment, is greater than a predefined level of utilization. The predefined level of utilization may be a system-wide value, a geo-domain value, a fault domain value, a domain value, a storage node value, or even a data store specific value. For example, depending on the demand, resources, and other similar factors, the predefined threshold may be adjusted dynamically to optimize a distributed computing environment, or the value may be static and predetermined based on similar factors.

At a step 506, the received data at step 502 is written to a journal store. In an exemplary embodiment, the journal store writes the data sequentially. Further, in an exemplary embodiment, if the first level of utilization determined at the step 504 is greater than a predefined level, the data is written to the journal store without write-caching the data to RAM for the benefit of a target store. In this example, the data is not write-cached to the RAM to allow the RAM utilization level to decrease over a period of time.

At a step 508, a second quantity of utilization of the RAM is determined. In an exemplary embodiment, the second quantity of utilization is determined to be less than the predefined threshold quantity.

At a step 510, data committed to the journal store is read and stored in the RAM for committal to the target store. In an exemplary embodiment, the data committed to the journal store at the step 506 is identified as being data committed to the data store, but not yet committed to the target store; therefore, the data is read from the journal store and then stored to the RAM as a write cache for the target store. In an additional exemplary embodiment, the journal store changes from a write-only mode prior to the step 510, to a read-only mode at the step 510. Further, the use of a journal store to populate RAM is done, in an exemplary embodiment, as a result of utilization of the RAM decreasing after previously being above a predefined threshold.

Figure 6:
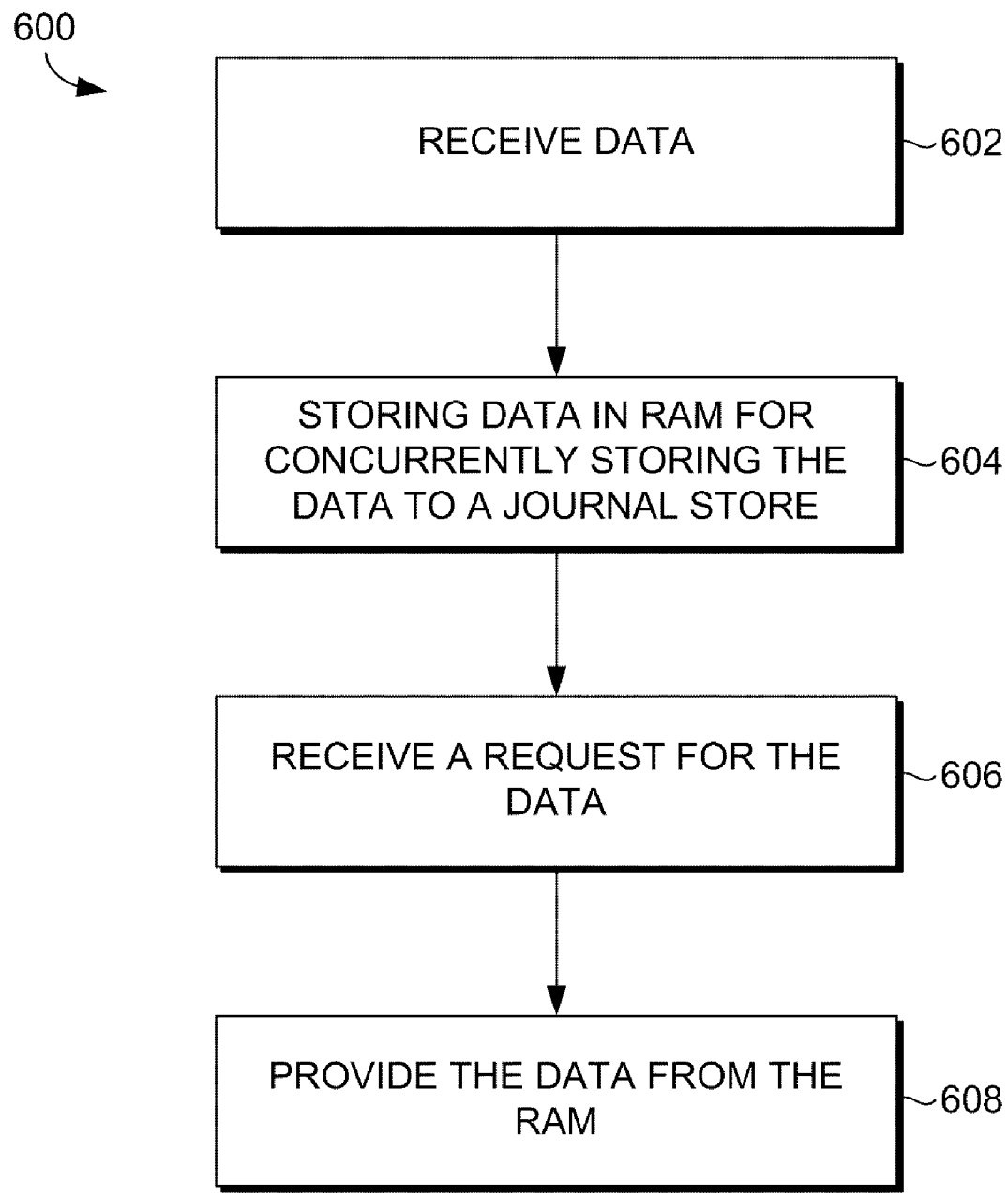
FIG. 6 depicts a method for sequentially writing data to a journal store to provide random access at a target store in a distributed computing environment in accordance with an embodiments of the present invention.

FIG. 6 depicts a method 600 for sequentially writing data to a journal store to provide random access at a target store in a distributed computing environment in accordance with an embodiment of the present invention. At a step 602, data is received. In an exemplary embodiment, the data is received by way of a network used in conjunction with a distributed computing environment. The data received at the step 602, in an embodiment, is received at a data store that includes at least a journal store, a target store, and RAM. In this example, the RAM serves as a cache, such as a write-cache, for the target store. Additionally, in this example, the target store supports random access while the journal store supports sequential writing of data. As previously discussed, the data may be received from a client by way of a network. Similarly, the received data may include a request for information or data stored in the data store.

At a step 604, the data received at the step 602 is sequentially written to the journal store from RAM. The step 604 additionally includes concurrently storing the data in RAM to be written from the RAM to the target store for random access. The concurrent writing of data in both the journal store and the RAM includes requesting received data to be stored in each of the mediums, the journal store and the RAM. The concurrent storing of data includes maintaining the data within the RAM as a write cache for a target spindle while serving the data to a journal store. In an exemplary embodiment, the data is stored in the RAM as a write cache for writing the data to both a journal store for sequential writing and a target store for random access.

In an additional exemplary embodiment, received data is committed in parallel to both a journal store and a target store. In an embodiment, the data is committed in parallel to the journal store and the target store without utilization of the RAM. Instead of relying on the RAM, in this example, write requests for the target store may be buffered prior to being committed to the target store until a defined threshold is exceeded. When the defined threshold is exceeded, the data may only be committed to the journal store (as opposed to buffered for the target store). In this example, a confirmation of persistent committal of the data may be returned following the committal of the data to the journal store, regardless of the status of committal of the data to the target store. Further, a confirmation that the data is durable may be provided once the data has been committed to at least 'N' (e.g., 2, 3, 4 ...) stores (i.e., journal stores, target stores). For example, once the data has been committed to three journal stores in varied data stores, a confirmation may be generated and communicated to a client that the data is now durable.

At a step 606, a request for the data is received. In an exemplary embodiment, the request for the data is received directly or indirectly from a client of a distributed computing environment. For example, the client may be a service operating, at least in part, on the distributed computing environment. The service may be requesting a role (e.g., functionality) needed by the client, wherein at least part of the role is stored at the data store receiving the request. In yet an additional exemplary embodiment, the request may be received from a client, such as a computing device operated by a user or service, wherein the request is for information stored at a data store receiving the request. Additionally, it is contemplated that the request is received, as a result of "pull" from the data store. For example, the data store may send a notice out to one or more computing devices identifying information stored therein. As a result of this notification, a computing device may provide a request for additional information (e.g., data) or the computing device may send a request for at least some of the data included in the original notification.

At a step 608, the data received at the step 602 is provided from the RAM. In an exemplary embodiment, the data is provided from the RAM because the data has yet to be committed to a target store for which the RAM is serving as a write cache. In yet an additional exemplary embodiment, the data is served from the RAM instead of providing the data from the journal store that also has committed the data. In this example, it may be advantageous to provide the data from the RAM instead of the journal store to take advantage of the random read access of the RAM as well as to avoid changing a write-only mode of the journal store (if the journal store is operating in such a mode), and to prevent from relying on a sequential read from the journal store (if the journal store wrote the data sequentially). Therefore, it is advantageous in this exemplary embodiment to serve the data from the RAM instead of waiting for the data to commit to the target store and to prevent having to read from the journal store for at least those reasons previously discussed.

In yet an additional exemplary embodiment, the providing of the data from the RAM at step 608 is performed prior to the data being written to the target store. And the data is provided from the RAM without providing the data from the journal store, even though the data is stored in the journal store. In this example, a determination is made that the data, while saved in both the RAM and the journal store, is to be served from the RAM and not from the journal store to achieve at least those advantages discussed hereinabove.

Figure 7:
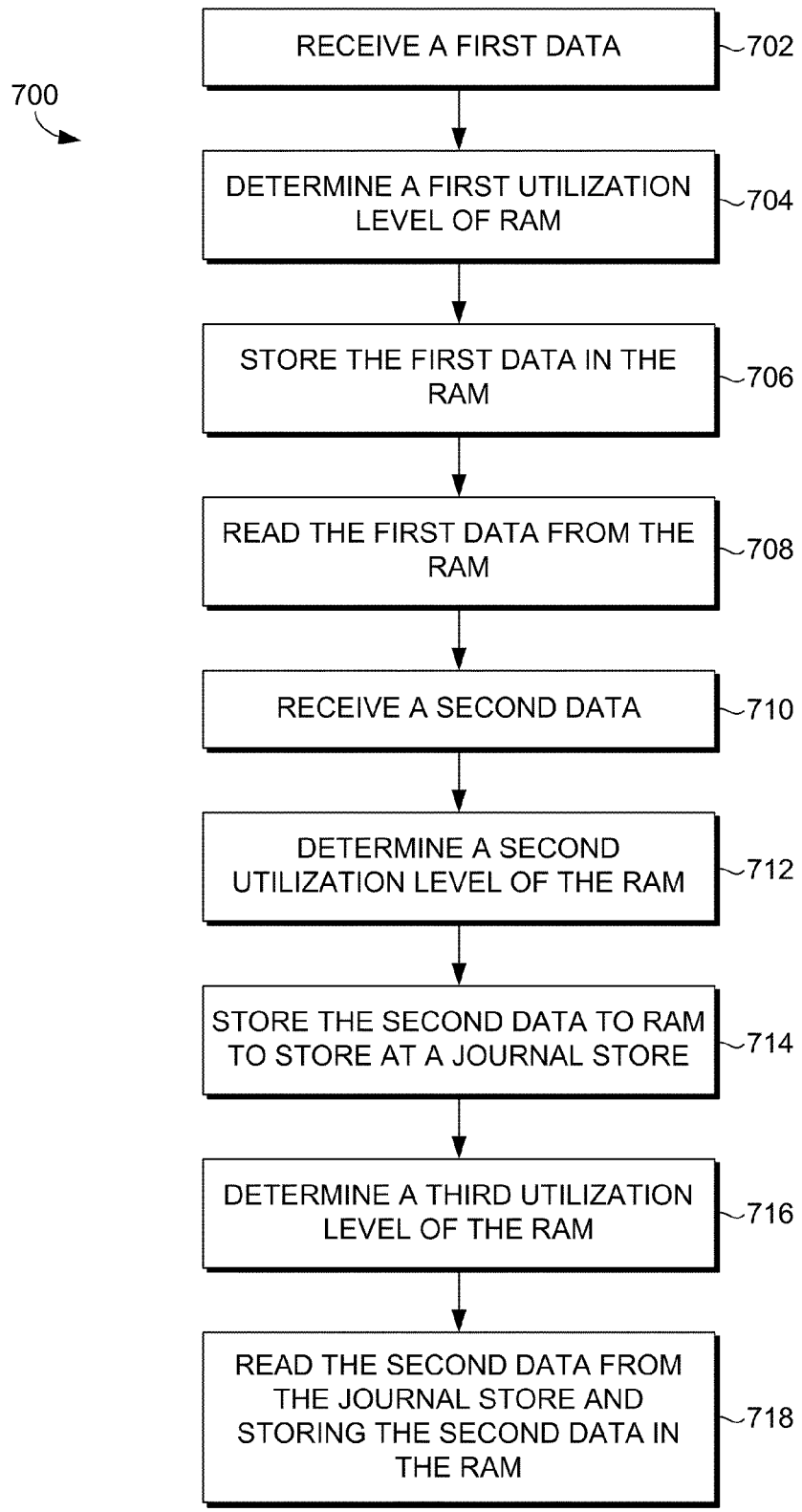
FIG. 7 depicts a method for sequentially writing data to a journal store to provide random access at a target store in a distributed computing environment in accordance with embodiment of the present invention.

FIG. 7 depicts a method 700 for sequentially writing data to a journal store to provide random access at a target store in a distributed computing environment in accordance with an embodiment of the present invention. At a step 702, a first data (e.g., set of datum) is received. In an exemplary embodiment, the data is received at a data store that includes at least a target store, a journal store, and RAM. Further, the data store, in this example, is associated with a distributed computing system. As previously discussed, the data may be received from a computing device, a user, an external data source, a client, or the like.

At a step 704, a first utilization level of the RAM is determined. In an exemplary embodiment, first utilization level is less than a predefined threshold level. As previously discussed, the predefined threshold limit may be any value, arbitrary or calculated, for limiting the demands on the RAM. The utilization of the RAM, in an embodiment, is limited as the RAM is used by other components of the data store, such as a processor and other computing devices (e.g., servers) to perform the functionality of the data store. Therefore, the RAM may have additional responsibilities in this embodiment other than acting as a write cache for a target store. However, in an additional exemplary embodiment, the RAM is dedicated memory storage to serve the functionality discussed herein for serving and storing received data.

At a step 706, the first data is stored in the RAM. In an exemplary embodiment, the data is allowed to be stored in the RAM as a result of the determination of the first utilization of the RAM being less than a predefined threshold. Additionally, at the step 706, the first data is also sequentially written to the journal store. Therefore, the data is stored in the RAM so that it may be non-sequentially written to the target store while also being written to the journal store in a sequential manner. A non-sequential manner of writing the data to the target store includes writing the data for random input/output operations. In an exemplary embodiment, a method of reading data is from a random access data store, such as a non-sequentially written data store.

At a step 708, the first data is read from the RAM. In an exemplary embodiment, as previously discussed, data stored in RAM, but not yet committed to a target store, may be served (e.g., read) from the RAM as opposed to increasing the potential for a timeout operation or increasing the latency by waiting until the data has been committed to the target drive from the RAM. Therefore, in this example, the first data is read from the RAM prior to writing the first data to the target store. Additionally, the first data is read from the RAM and not from the journal store to ensure the journal store may continue to write incoming data.

At a step 710, a second data is received. In an exemplary embodiment, the second data is merely an additional portion of a stream of semi-continuous data being communicated to the data store. Therefore, the data received at a data store may be a data stream, wherein the portion received at any given time is considered a distinct set of data. Therefore, the receiving of a first data and the receiving of a second data includes receiving a single data stream evaluated at two different times.

At a step 712, a second utilization level of the RAM is determined. In an exemplary embodiment, the second utilization level is greater than the predefined threshold level. In this example, the predefined threshold level may be the same as the predefined threshold level used at the step 704. But, in an additional exemplary embodiment, the predefined threshold varies depending on the previous state of the RAM. For example, if the RAM was previously determined to be overburdened based on a utilization level; the predefined level may be lowered to provide a margin for the RAM to accept additional data prior to exceeding the predefined threshold level.

At a step 714, the second data is stored in the RAM to be written to the journal store. In an exemplary embodiment, the second data is written to the journal store in response to determining the second utilization level. Additionally, in an exemplary embodiment, the second data is written to the journal in a sequential manner. Further yet, an exemplary embodiment includes writing the second data to the journal store without write-caching the second data in the RAM for the benefit of a target store. For example, if the RAM has a utilization level greater than a predefined threshold, the RAM is provided an opportunity to reduce an associated level of utilization by preventing additional data being write-cached to the RAM for the target store. Therefore, by directing the data to the journal store and not write-caching at the RAM for the target store, the RAM may unload the cached data to a target drive.

At a step 716, a third utilization level of the RAM is determined. In an exemplary embodiment, the third determination is subsequent in time to the second determination that is also subsequent in time to the first determination. Therefore, as time passes, regardless of duration, the state of the RAM is in flux and therefore has varied levels of utilization. In yet an additional exemplary embodiment, the determined third level of utilization is less than the predefined threshold. Once again, it is contemplated that the predefined level of utilization may dynamically adjust depending on the previous mode or state of the RAM or other components in the data store. The utilization of RAM, in an exemplary embodiment, is dynamic as a result of committing data to a journal store and/or a target store. For example, an amount of time required to maintain data in RAM to be written to a journal store may be less than the amount of time required to maintain the data to be written to a target store or a combination of a target store and a journal store. Therefore, in an example, the utilization of RAM may be reduced in a faster manner by committing the data to a journal store only and not to a target store.

At a step 718, the second data is read from the journal store. Additionally, at the step 718, the second data read from the journal store is also stored in the RAM to be used as a write cache so that is may be committed to a target store. In an exemplary embodiment, the actions at the step 718 are performed in response to the third level of utilization being less than a predefined threshold. However, it is contemplated that the actions of the step 718 are performed as a result of different factors, such as a predetermined time duration has passed, a quantity of data being received is at a specified level, or the like.

Figure 8:
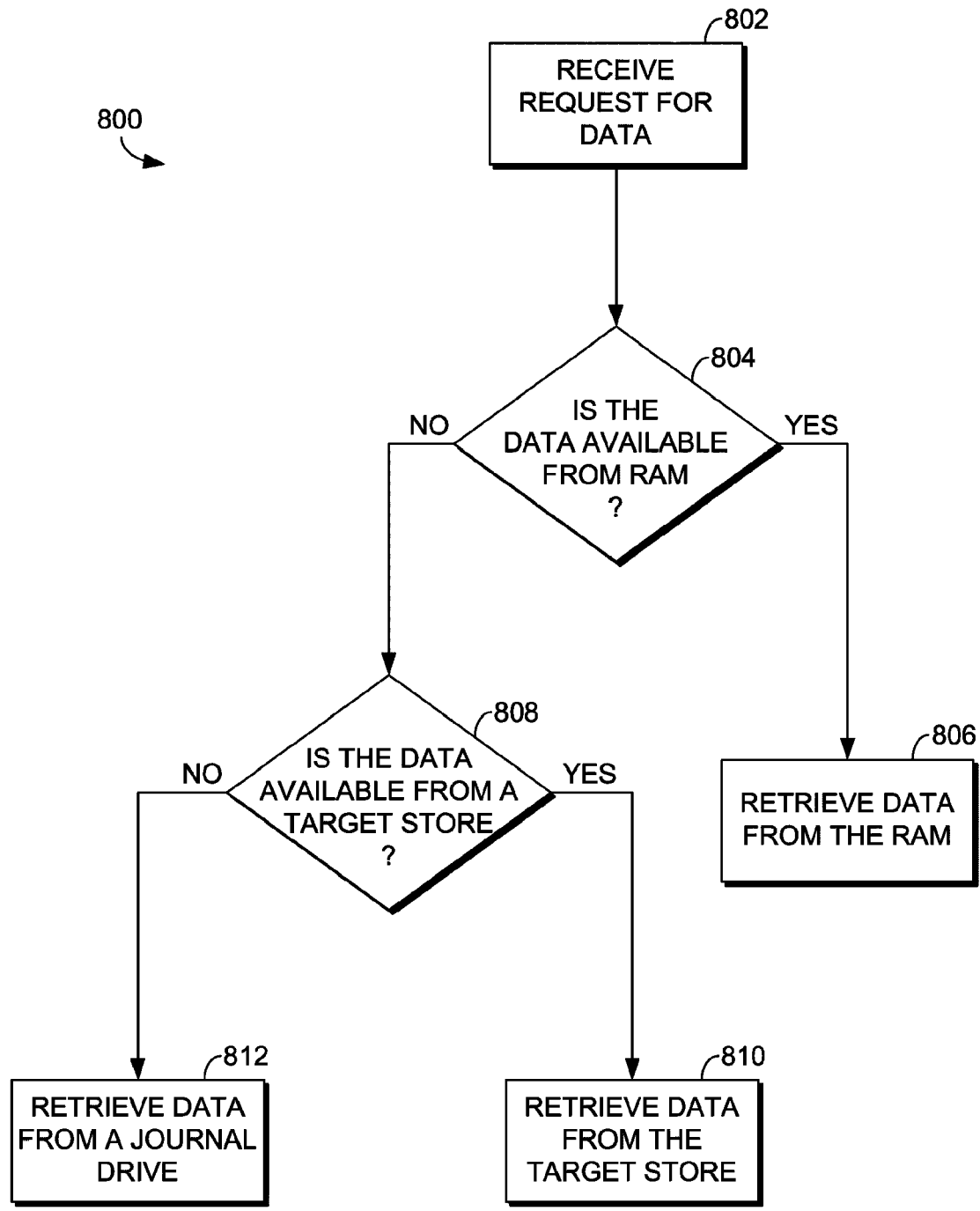
FIG. 8 depicts a method for selecting a source from which data is retrieved in a data store having a target store, a journal store, and random access memory in a distributed computing environment in accordance with embodiments of the present invention.

FIG. 8 depicts a method 800 for selecting a source from which data is retrieved in a data store having a target store, a journal store, and RAM in a distributed computing environment in accordance with an embodiment of the present invention. At a step 802, a request for data is received. In an exemplary embodiment, the request for data is received at a data store. The request for data may be communicated by a client, a service, a user, a controller, or even a user of a computing device. In an exemplary embodiment, the request has been forwarded to a particular data store that is known to have committed at least part of the requested data or information. However, the data may be committed or stored to either a journal store, RAM, or a target store at the point the request is received. This is in part based on an exemplary system of providing an acknowledgement of the committal of received data from a data store once the data has been committed to the first of a journal store or a target store. However, in an exemplary embodiment, the received data is general committed to a journal drive prior to a target drive because a journal drive that writes the data sequential generally has a much higher throughput than a target drive that writes the data non-sequentially. But, as will be discussed with the method 800, embodiments of the present invention have a preference for reading/retrieving data/information from a non-sequential target store than from a sequential journal store. Further, in an exemplary embodiment, the request for the data is received by way of a request communicating component, such as the request communicating component 316 of FIG. 3.

At a step 804, a determination is made to determine if the requested data is available from RAM. The data may be available from RAM if the data has not been committed to the target store. Information as to what data has been committed by which stores of a data store may be maintained as part of a table or other data structure either locally or remotely. For example, a storage manager or other service may maintain a data structure that indicates at which data store data may be accessed. Such a controller or service may be beneficial in an embodiment where three instances or copies of the data have been saved to at least three distinct data stores in order to accomplish reliability, durability, and redundancy in a distributed computing environment.

If the determination at the step 804 indicates that the data is available from RAM, the method 800 proceeds to a step 806. At the step 806, the data is retrieved from the RAM in which it has been identified as being available. The retrieval of the data may include reading the data from the RAM.

In the alternative, if the determination at the step 804 determines the requested data is not available from RAM, the method 800 proceeds to a step 808. At the step 808, a determination is performed to determine if the requested data is available from a target store. In an exemplary embodiment, the determination at step 808 determines if the latest version of the requested data is available at a target store.

If a determination that the requested data is available from the target store is made at the step 808, the method 800 proceeds to a step 810. At the step 810, the requested data is retrieved from the target store in order to fulfill the request. However, if the determination at the step 808 determines the latest information is not available at the target store, the method 800 proceeds to the step 812. At the step 812, the requested data is retrieved from a journal drive. In an exemplary embodiment, the retrieval of the data from the journal drive requires that journal drive to switch out of a write-only mode to a read-only in order to serve the requested data. Additionally, in an exemplary embodiment, the journal drive serves the requested data in a sequential manner as that is the format in which the journal drive may have committed the information if the journal store is a spinning media. However, as previously discussed, when the journal store is a solid state nonvolatile memory, the data may be read in a random access manner.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for sequentially writing data to a journal store to provide random access at a target store in a distributed computing environment, the method comprising:
   receiving data at a data store, the data store comprising a journal store, Random Access Memory (RAM), and at least one target store;
   determining, with a processor, a first quantity of utilization of the RAM, wherein the first quantity is greater than a predefined threshold quantity;
   in response to determining the first quantity of utilization, sequentially writing the data to the journal store without write-caching the data at the RAM for storing to at least one target store;
   determining a second quantity of utilization of the RAM, wherein the second quantity is less than the predefined threshold quantity; and in response to determining the second level of utilization, reading the data from the journal store and storing the data in the RAM for writing to the at least one target store.

2. The method of claim 1, wherein the journal store is a non-volatile solid state computer readable memory.

3. The method of claim 2, wherein the journal store and the RAM are non-volatile solid state storage memory.

4. The method of claim 1, wherein the RAM is a write cache for the at least one target store.

5. The method of claim 1, wherein at least one of the first quantity of utilization, the second quantity of utilization, or the predefined threshold quantity is a relative value.

6. The method of claim 1, wherein the first quantity of utilization is determined temporally before the second quantity of utilization.

7. The method of claim 1, wherein a level of utilization changes from the first level of utilization to the second level of utilization as a result of writing information from the RAM to the at least one target store.

8. The method of claim 1 further comprising:
receiving a request for the data; and
prior to the data being written to the at least one target store, fulfilling the request from the RAM without reading the data from the journal store.

9. The method of claim 1 further comprising:
receiving a request for the data; and
reading the data from the journal store.

10. The method of claim 1, wherein the journal store has a first data throughput value that exceeds a second data throughput value of the at least one target store.

11. The method of claim 1, wherein the data store is associated with a distributed computing system.

12. One or more computer storage devices having computer-executable instructions embodied thereon, that when executed by a computing system having a processor and memory, cause the computing system to perform a method for sequentially writing data to a journal store to provide random access at a target store in a distributed computing environment, the method comprising:
receiving data at a data store, the data store comprising a journal store, a target store, and Random Access Memory (RAM), wherein the RAM serves as a write cache for the target store;
storing the data in the RAM to be written from the RAM to the target store for random access;
writing the data, in a sequential manner, to the journal store from the RAM;
receiving a request for the data; and
prior to the data being written to the target store, providing the data in response to the request, wherein the data is provided from the RAM without providing the data from the journal store.

13. The computer storage devices of claim 12, wherein the method further comprises writing the data to the target store from the RAM.

14. The computer storage devices of claim 12, wherein a second set of data is provided in response to a second request in the following order:
1) providing the second set of data from the RAM,
2) when the second set of data is unavailable from the RAM, providing the second set of data from the target store, and
3) when the second set of data is unavailable from both the RAM and the target store, providing the second set of data from the journal store.

15. The computer storage devices of claim 12, wherein the journal store is non-volatile solid state memory.

16. The computer storage devices of claim 12, wherein the RAM and the target store support random access.

17. The computer storage devices of claim 12, wherein the method further comprises:
determining a level of utilization of the RAM that exceeds a predefined threshold; and
preventing write-caching for the target store from the RAM until the level of utilization of the RAM is below the predefined threshold.

18. The computer storage devices of claim 12, wherein the method further comprises:
after a power failure to the RAM, reading from the journal store information that has yet to be written to the target store.

19. The computer storage devices of claim 12, wherein the method further comprises:
determining the data has yet to be written to the target store and the data is unavailable in the RAM;
identifying the data on the journal store; and
writing the data to the target store for random access.

20. One or more computer storage devices having computer-executable instructions embodied thereon, that when executed by a computing system having a processor and memory, cause the computing system to perform a method for sequentially writing data to a journal store to provide random access at a target store in a distributed computing environment, the method comprising:
receiving a first data at the data store in the distributed computing environment, wherein the data store comprising the journal store, the target store, and Random Access Memory (RAM);
determining a first utilization level of the RAM, wherein the first utilization level is less than a predefined threshold level;
storing the first data in the RAM and sequentially writing the first data to the journal store, wherein the first data is stored in the RAM to be written to the target store in a non-sequential manner;
prior to writing the first data to the target store, reading the first data from the RAM instead of the journal store in response to a request for the first data;
receiving a second data at the data store;
determining a second utilization level of the RAM, wherein the second utilization level is greater than the predefined threshold level;
in response to determining the second utilization level, sequentially writing the data to the journal store without write-caching, at the RAM, the second data for the target store;
subsequent to sequentially writing the second data to the journal store, determining a third level of utilization of the RAM, wherein the third level of utilization is less than the predefined threshold; and
in response to determining the third utilization level, reading the second data from the journal store and storing the second data in the RAM to allow the second data to be written to the target stored.

* * * * *